United States Patent
Giselmo

(10) Patent No.: US 10,718,261 B2
(45) Date of Patent: Jul. 21, 2020

(54) TURBOCHARGER, AND A METHOD FOR MANUFACTURING A TURBOCHARGER

(71) Applicant: VOLVO TRUCK CORPORATION, Göteborg (SE)

(72) Inventor: Kent Giselmo, Vellinge (SE)

(73) Assignee: VOLVO TRUCK CORPORATION, Göteborg (SE)

(*) Notice: Subject to any disclaimer, the term of this patent is extended or adjusted under 35 U.S.C. 154(b) by 166 days.

(21) Appl. No.: 15/535,968

(22) PCT Filed: Dec. 19, 2014

(86) PCT No.: PCT/EP2014/025028
§ 371 (c)(1),
(2) Date: Jun. 14, 2017

(87) PCT Pub. No.: WO2016/095940
PCT Pub. Date: Jun. 23, 2016

(65) Prior Publication Data
US 2017/0335758 A1    Nov. 23, 2017

(51) Int. Cl.
*F02B 37/24*  (2006.01)
*F01D 11/00*  (2006.01)
(Continued)

(52) U.S. Cl.
CPC ............ *F02B 37/24* (2013.01); *F01D 11/005* (2013.01); *F01D 17/165* (2013.01); *F02C 6/12* (2013.01);
(Continued)

(58) Field of Classification Search
CPC ...... F02B 37/18; F02B 37/183; F02B 37/186; F02B 37/24; F01D 17/165; F02C 7/24;
(Continued)

(56) References Cited

U.S. PATENT DOCUMENTS 4,171,936 A * 10/1979 Hageman ................ F02B 37/18
60/602
4,657,476 A * 4/1987 Berg ..................... F01D 17/165
415/164
(Continued)

FOREIGN PATENT DOCUMENTS

EP    1816317 A2    8/2007
JP    20/0196653 A   9/2010
(Continued)

OTHER PUBLICATIONS

Chinese Official Action (dated Oct. 31, 2018) for corresponding Chinese App. 201480084195.0.
(Continued)

*Primary Examiner* — Thai Ba Trieu
(74) *Attorney, Agent, or Firm* — Venable LLP; Jeffri A. Kaminski

(57) ABSTRACT

A turbocharger having a swing vane nozzle assembly—VGT—is provided. The turbocharger includes a turbine housing and a bearing housing. The swing vane nozzle assembly includes a front nozzle ring, a rear nozzle ring, and a plurality of pivotable gas flow control vanes arranged between the front nozzle ring and the rear nozzle ring. The rear nozzle ring is radially guided by the turbine housing, a radially outer portion of the front nozzle ring is clamped between the bearing housing and the turbine housing thus forming an axial guidance of the front nozzle ring, and an inner periphery of the front nozzle ring is arranged at a distance from the bearing housing.

19 Claims, 5 Drawing Sheets

(51) Int. Cl.
*F01D 17/16* (2006.01)
*F02C 6/12* (2006.01)
*F02C 7/24* (2006.01)

(52) U.S. Cl.
CPC ............ *F02C 7/24* (2013.01); *F05D 2220/40* (2013.01); *F05D 2230/64* (2013.01); *F05D 2240/12* (2013.01); *F05D 2240/55* (2013.01); *F05D 2260/231* (2013.01); *F05D 2260/30* (2013.01); *Y02T 10/144* (2013.01)

(58) Field of Classification Search
CPC ............ F05D 2220/40; F05D 2230/64; F05D 2240/12; F05D 2240/55; F05D 2260/30; Y02T 10/144
USPC ........... 60/602; 415/159–164, 146; 29/889.2, 29/889.21
See application file for complete search history.

(56) References Cited

U.S. PATENT DOCUMENTS

| | | | | |
|---|---|---|---|---|
| 6,763,587 B2 * | 7/2004 | Jinnai | ................... | F01D 17/165 415/164 |
| 6,916,153 B2 * | 7/2005 | Boening | ............... | F01D 17/165 415/163 |
| 7,189,058 B2 * | 3/2007 | Metz | .................... | F01D 11/003 415/165 |
| 7,303,370 B2 | 12/2007 | Metz et al. | | |
| 8,291,703 B2 * | 10/2012 | Garrett | ................. | F01D 17/167 60/602 |
| 2005/0252210 A1 * | 11/2005 | Shiraishi | ............... | F01D 17/165 60/602 |
| 2007/0277525 A1 * | 12/2007 | Stilgenbauer | ......... | F01D 17/165 60/602 |
| 2009/0060726 A1 * | 3/2009 | Severin | ................ | F01D 17/165 415/182.1 |
| 2010/0008774 A1 | 1/2010 | Scholz et al. | | |
| 2010/0316490 A1 | 12/2010 | Severin et al. | | |
| 2011/0138805 A1 | 6/2011 | Barthelet et al. | | |
| 2012/0128471 A1 * | 5/2012 | Luck | .................... | F01D 17/143 415/158 |
| 2013/0084161 A1 | 4/2013 | Groves et al. | | |
| 2013/0323021 A1 * | 12/2013 | Bogner | .................. | F01D 25/14 415/116 |
| 2014/0086725 A1 * | 3/2014 | Shi | ........................ | F01D 17/165 415/58.7 |
| 2014/0133970 A1 | 5/2014 | Groves | | |
| 2014/0161595 A1 * | 6/2014 | Tashiro | ................... | F02B 37/24 415/146 |
| 2014/0178181 A1 | 6/2014 | Tashiro et al. | | |
| 2015/0056067 A1 * | 2/2015 | Segawa | ................ | F01D 17/165 415/167 |
| 2015/0308330 A1 * | 10/2015 | Arnold | .................. | F01D 17/165 60/602 |
| 2016/0003138 A1 * | 1/2016 | Iizuka | ................... | F01D 17/165 415/148 |
| 2016/0090865 A1 * | 3/2016 | Svihla | ................... | F01D 25/243 60/605.1 |
| 2017/0067359 A1 * | 3/2017 | Khan | ..................... | F01D 17/165 |
| 2018/0328280 A1 * | 11/2018 | Eckl | ...................... | F01D 17/165 |

FOREIGN PATENT DOCUMENTS

| | | | | |
|---|---|---|---|---|
| KR | 20100020323 A | * | 2/2010 | ........... F01D 17/165 |
| WO | WO-2013047154 A1 | * | 4/2013 | ............. F02B 37/24 |
| WO | 2013116136 A1 | | 8/2013 | |
| WO | 2013189506 A1 | | 12/2013 | |

OTHER PUBLICATIONS

International Search Report (dated Aug. 27, 2015) for corresponding International App. PCT/EP2014/025028.
International Preliminary Report on Patentability (dated Mar. 24, 2017) for corresponding International App. PCT/EP2014/025028.

* cited by examiner

TURBOCHARGER, AND A METHOD FOR MANUFACTURING A TURBOCHARGER

BACKGROUND AND SUMMARY

The invention relates to a turbocharger having a swing vane nozzle assembly, and a method for manufacturing a turbocharger, The invention can be applied in heavy-duty vehicles, such as trucks, buses and construction equipment. Although the invention will be described with respect to a truck, the invention is not restricted to this particular vehicle, but may also be used in other applications utilizing turbocharger units such as aero or marine systems.

A turbocharger unit is a vehicle component used together with an associated internal combustion engine, typically a diesel engine. The turbocharger unit is configured to recover a part of the energy of the exhaust gas and to use that energy to compress intake air flowing into the combustion chamber of the internal combustion engine. Turbocharger units are commonly provided for increasing the efficiency and power of the internal combustion engine.

A turbocharger unit has three main components; a turbine for converting energy of the exhaust gas flow to a rotational movement of the turbine, a compressor rotationally connected to the turbine for compressing intake air, and a housing enclosing the turbine and the compressor as well as a rotating shaft, bearings, etc.

Some turbochargers are provided with a swing vane nozzle assembly. Such turbochargers, also known as variable geometry turbochargers (VGTs) allow the intake airflow to be controlled and thereby optimized over a range of engine speeds. A VGT may for this purpose be provided with a plurality of inlet guide vanes on the turbine stator. An inlet passage to the turbine has a circumferential extension around the turbine and forms an annular passageway. The inlet guide vanes on the turbine stator are arranged circumferentially spaced in this passage. The intake airflow is optimized by changing the angle of the inlet guide vanes on the turbine stator. An optimal position for the inlet guide vanes is determined from a combination of desired torque response, fuel economy, and emission requirement. More specifically, the annular passageway is connecting a scroll shaped volute defined in the turbine housing to a turbine chamber where the turbine is located.

The inlet guide vanes are arranged between a front nozzle ring and a rear nozzle ring, such that the swing vane nozzle assembly, comprising the nozzle rings and the inlet guide vanes, is arranged radially outside the turbine. For efficiency reasons it is desired to have a very small axial clearance between the inlet guide vanes and the nozzle rings. Due to such small clearance any distortion of the nozzle rings must be prevented in order to reduce the risk for sticking of the inlet guide vanes.

An important aspect of VGT's is thus how to attach the swing vane nozzle assembly in order to avoid the distortion of the nozzle rings and to minimize heat inflow into the bearing housing. Too high heat inflow can lead to oil coking problems for the bearings.

JP2010196653 describes a swing vane nozzle assembly wherein a first nozzle ring is guided axially at its outer periphery, and guided radially at its inner periphery. The second nozzle ring is radially guided at its inner periphery, and a radial step of the turbine housing provides an axial guidance for the inner periphery of the second nozzle ring. The solution described in the prior art document however suffers from the disadvantage that deformations, or distortion of the nozzle rings may occur due to a difference in thermal expansion of the bearing housing, guiding the first nozzle ring, and the turbine housing guiding the second nozzle ring.

It is desirable to provide a turbocharger overcoming the above mentioned drawback of prior art turbochargers.

Since the inner periphery of the front nozzle ring is arranged at a distance from the bearing housing, no radial guidance of the front nozzle ring is provided. The swing vane nozzle assembly may therefore withstand thermal expansions with a reduced risk for sticking of the inlet guide vanes.

A turbocharger having a swing vane nozzle assembly is therefore provided. The turbocharger comprises a turbine housing and a bearing housing, and the swing vane nozzle assembly is configured to control an exhaust gas flow to a turbine arranged inside the turbine housing. The swing vane nozzle assembly comprises a front nozzle ring, a rear nozzle ring, and a plurality of pivotable gas flow control vanes arranged between the front nozzle ring and the rear nozzle ring. The rear nozzle ring is radially guided by the turbine housing, while a radially outer portion of the front nozzle ring is clamped between the bearing housing and the turbine housing thus forming an axial guidance of the front nozzle ring. An inner periphery of the front nozzle ring is arranged at a distance from the bearing housing.

In an embodiment, the turbocharger comprises a heat shield being arranged between the bearing housing and the inner periphery of the front nozzle ring. Since there is a radial gap between the bearing housing and the inner periphery of the front nozzle ring, the turbocharger allows for a very simple and robust heat shield.

In an embodiment the heat shield has an annular shape having a radially inner portion and a radially outer portion, the outer portion being axially displaced relative the inner portion. The outer portion of the heat shield may be axially displaced in a direction towards a turbine arranged inside the turbine housing, and the outer portion of the heat shield, may seal against the from nozzle ring. The heat shield may thus be attached to the bearing housing in a very simple way, while it achieves the desired shielding properties by isolating the bearing housing and its associated components from the heat of the exhaust gases.

In an embodiment the interface between the bearing housing and the turbine housing forms a recess in which the radially outer portion of the front nozzle ring is received. Clamping of the front nozzle ring is therefore easily achieved. The width of the recess may be slightly larger than the width of the radially outer portion of the front nozzle ring such that the axial guidance is formed by a light clearance fit.

In an embodiment, the turbocharger comprises a spring, such as a plate spring, arranged between the bearing housing and the radially outer portion of the front nozzle ring. The spring may thus provide an axial prestress to the front nozzle ring.

In an embodiment the turbocharger further comprises a seal arranged between the turbine housing and the inner periphery of the rear nozzie ring for further improving the radial guidance of the swing vane nozzle assembly. The seal may in some embodiments be an O-ring.

An exhaust aftertreatment system for an internal combustion engine is also provided. The exhaust aftertreatment system comprises at least one turbocharger according to the first aspect.

A vehicle is also provided. The vehicle comprises an exhaust aftertreatment system according to the second aspect.

A method for manufacturing a turbocharger with a swing vane nozzle assembly is also provided. The swing vane nozzle assembly has a front nozzle ring, a rear nozzle ring, and a plurality of pivotable gas flow control vanes arranged between the front nozzle ring and the rear nozzle ring. The method comprises the steps of: arranging the rear nozzle ring onto a cylindrical portion of a turbine housing such that the rear nozzle ring is radially guided by the turbine housing, and arranging a radially outer portion of the front nozzle ring between a bearing housing and the turbine housing thus forming an axial guidance of the front nozzle ring. The step of arranging the radially outer portion of the front nozzle ring is performed such that an inner periphery of the front nozzle ring is arranged at a distance from the bearing housing.

In an embodiment the method further comprises the step of providing a heat shield between the bearing housing and the inner periphery of the front nozzle ring. This step may be performed such that the outer portion of the heat shield seals against the front nozzle ring.

In an embodiment the method further comprises the step of arranging a spring between the bearing housing and the radially outer portion of the front nozzle ring.

In an embodiment the method further comprises the step of arranging a seal between the turbine housing and the inner periphery of the rear nozzle ring.

In an embodiment the steps of arranging the rear nozzle ring onto a cylindrical portion of a turbine housing, and arranging a radially outer portion of the front nozzle ring between a bearing housing and the turbine housing are performed by positioning the swing vane nozzle assembly in the bearing housing, and thereafter arranging the turbine housing in the correct position relative the bearing housing. In such embodiment, the step of arranging the heat shield may be performed before the step of positioning the swing vane nozzle assembly in the bearing housing.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
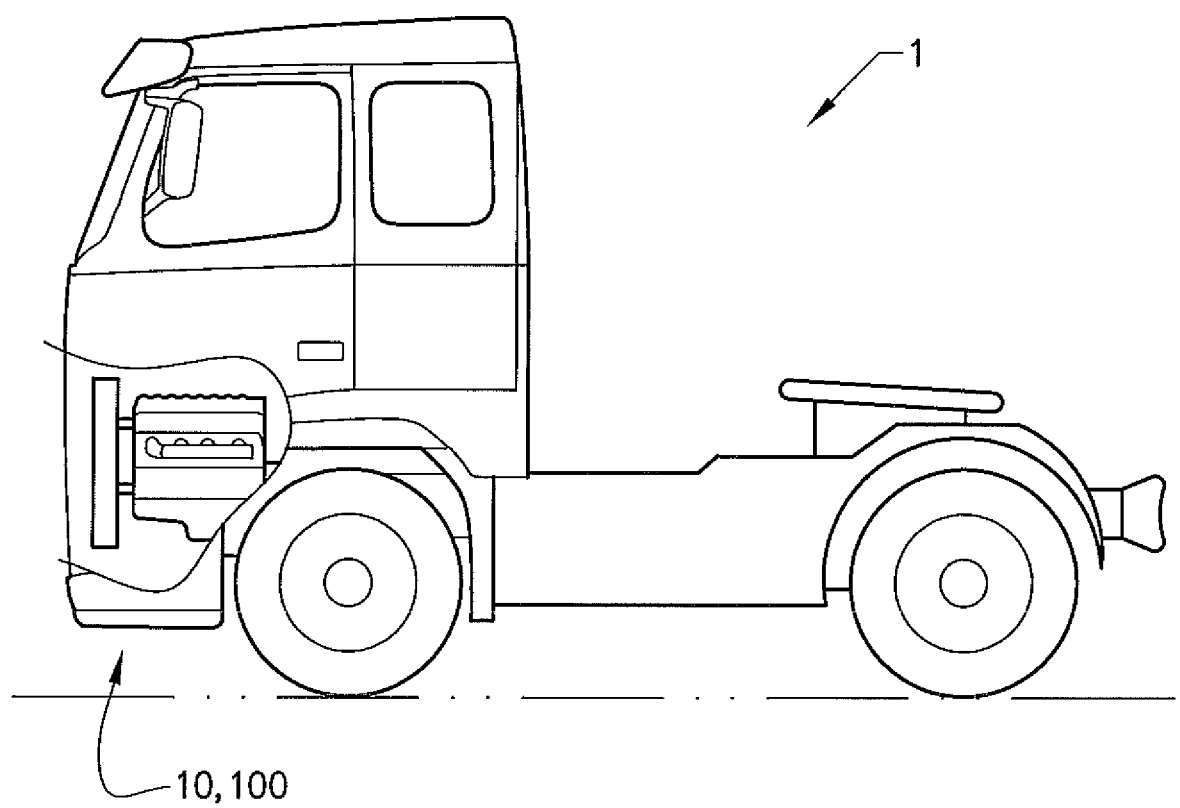
FIG. 1 is a side view of a vehicle according to an embodiment.

Starting with FIG. 1 a vehicle 1 is shown. The vehicle 1, which is illustrated as a truck, has an internal combustion engine 10 for driving the vehicle 1. As will be further explained below the internal combustion engine 10 of the vehicle 1 is provided with a turbocharger 100 according to various embodiments as will be further explained below. The vehicle 1 may have additional propulsion units, such as electric drives etc. as long as it has at least one engine providing a flow of exhaust gases interacting with the turbocharger 100. Hence the vehicle 1 is not exclusively a truck but may also represent various heavy duty vehicles such as buses, constructional equipment, etc.

Figure 2A:
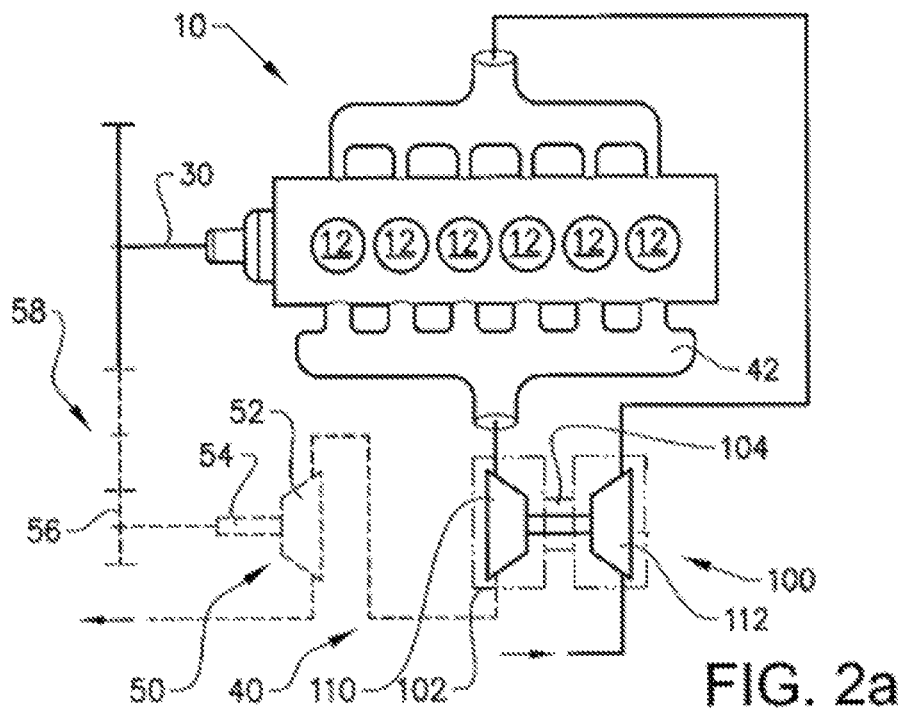
FIGS. 2a and 2b are schematic views of an internal combustion engine including an exhaust aftertreatment system according to different embodiments.
Figure 2B:
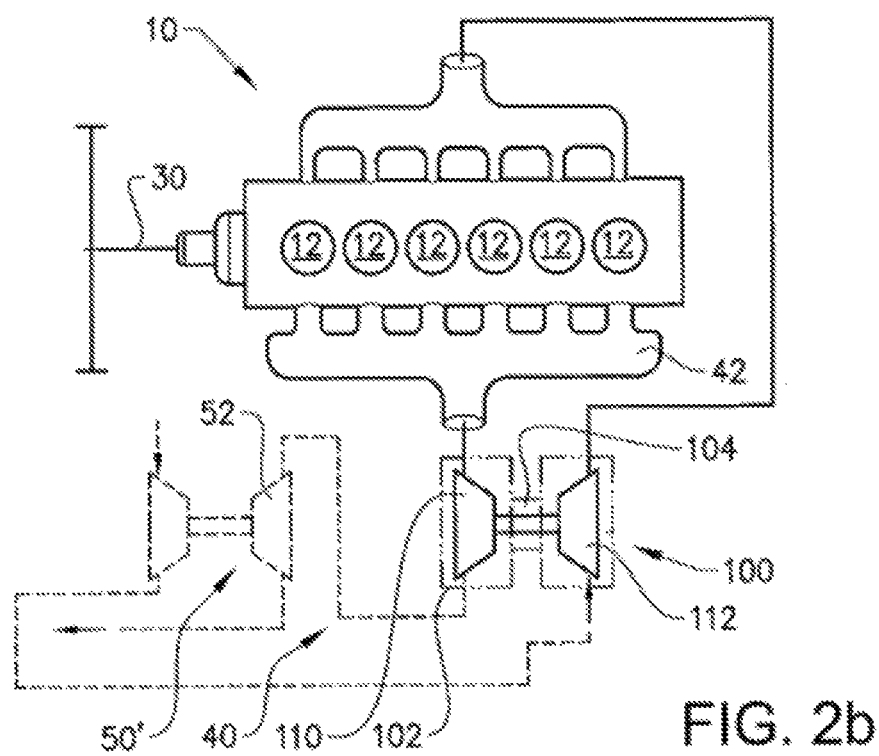

In FIGS. 2a and 2b examples of an internal combustion engine 10 are shown. The internal combustion engine 10 includes a plurality of cylinders 12 operated to combust fuel, such as diesel or gasoline, whereby the motion of pistons reciprocating in the cylinders 12 is transmitted to a rotation movement of a crank shaft 30. The crank shaft 30 is further coupled to a transmission (not shown) for providing a torque to driving elements (not shown). In case of a heavy vehicle, such as a truck, the driving elements are wheels; however the internal combustion engine 10 may also be used for other equipment such as construction equipment, marine applications, etc.

The internal combustion engine 10 further comprises an exhaust aftertreatment system 40, which system 40 serves the purpose of recovering at least some of the energy in the exhaust gas flow to improve the performance of the internal combustion engine 10. In the shown examples the exhaust gas exits the cylinders 12 and enters a manifold 42 which is further connected to an inlet of a turbocharger 100. The exhaust gas flow causes a turbine wheel 110 to rotate, which rotation is translated to a corresponding rotation of a compressor wheel 112 being used to compress incoming air before it is introduced in the cylinders 12.

The turbocharger 100 may form one of the stages of a two-stage turbocharger system. As is shown in FIG. 2a, the exhaust gas exits the turbocharger 100 and flows downstream, optionally to a turbocompound unit 50. In such embodiment the incoming exhaust gas, from which some energy have already been used to drive the turbine wheel 110 of the turbocharger unit 100, is guided to pass a turbine wheel 52 of the turbocompound unit 50, thus causing the turbine wheel 52 and an associated turbine shaft 54 to rotate. The rotation of the turbine shaft 54 is transmitted to a corresponding rotation of a gear wheel 56. The gear wheel 56 meshes with further gearings 58 in order to couple the turbine shaft 54 of the turbocompound unit 50 to the crankshaft 30. Hence, when the turbine wheel 54 is forced to rotate the turbine shaft 54 will provide an additional torque to the crankshaft 30.

In FIG. 2b another embodiment is shown, wherein the turbocharger 100 forms the high pressure stage of a two-stage turbocharger system. Hence, a low pressure turbocharger 50' is arranged in series with the turbocharger 100.

The exhaust aftertreatment system 40 thus comprises the manifold 42, the turbocharger 100, and optionally the low pressure turbocharger 50'or the turbocompound unit 50. Additional components well known in the art may also form part of the exhaust aftertreatment system 40.

Figure 3:
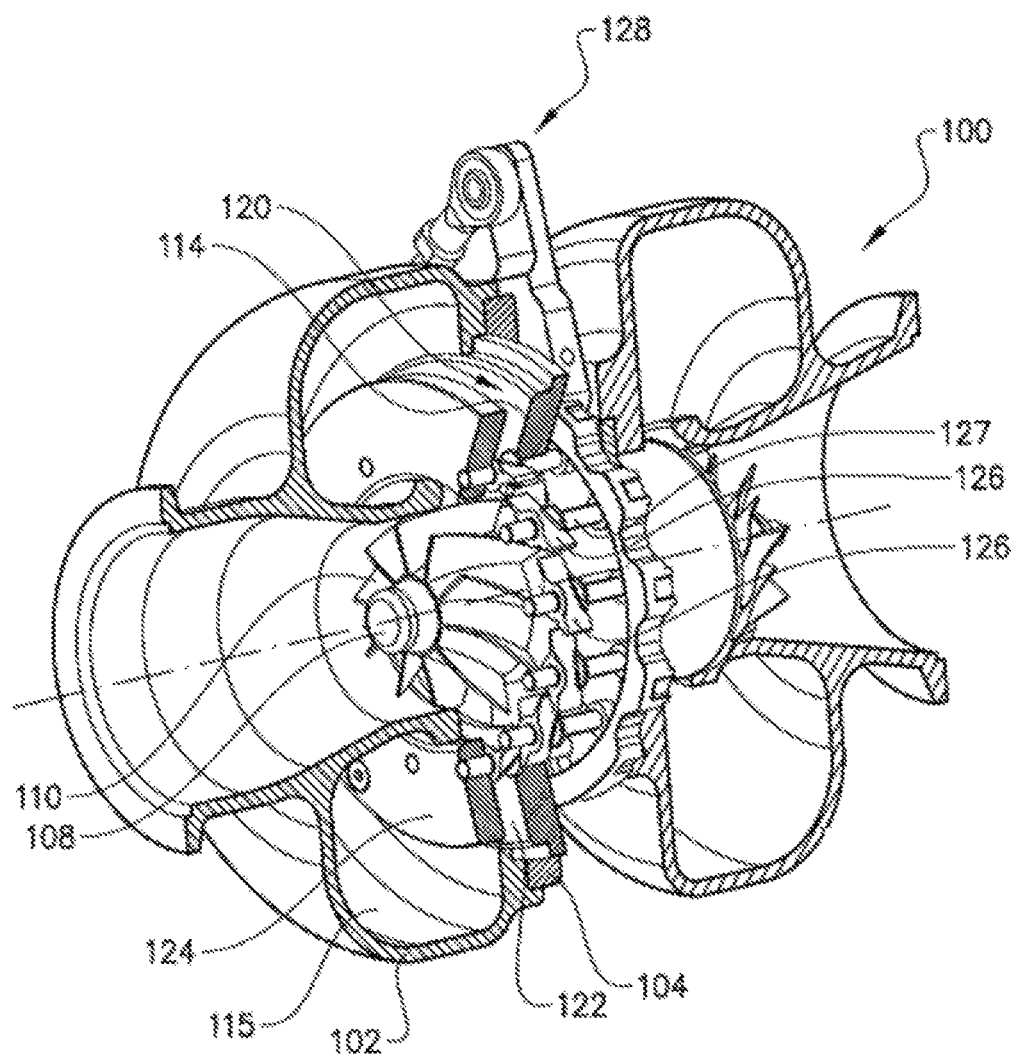
FIG. 3 is an isometric cross-sectional view of a turbocharger according to an embodiment.

An embodiment of the turbocharger 100 is further shown in FIG. 3. The turbocharger is a VGT, whereby an adjustable swing vane nozzle assembly is provided.

FIG. 3 shows a partly cut perspective view of the turbocharger 100. The turbocharger 100 comprises a turbine housing 102 which defines a turbine chamber where the turbine 110 is located. A passage 114 in the form of an annular passageway is formed in the turbine housing 102 and connects a scroll shaped volute 1 5 defined in the turbine housing 102 to the turbine chamber where the turbine 110 is located. In other words, the passage 114 forms a slot extending in a circumferential direction.

The turbocharger 100 comprises a swing vane nozzle assembly 120 for controlling a gas flow through the annular passageway passage 114 and thereby the flow of exhaust gas through the turbine 110. The swing vane nozzle assembly 120 comprises a plurality of pivotable gas flow control vanes 126. The pivot axes of the plurality of pivotable gas flow control vanes 126 are circumferentially spaced in the direction of the annuiar passageway 114. More specifically, each vane 126 may be connected to a vane pin 127 housed in the turbine housing 102, The vane pins 127 for all vanes 126 are preferably arranged in parallel with each other. Further, the vane pins 127 for the vanes 126 are arranged in parallel with an axial direction of the turbine shaft 108.

The pivotable gas flow control vanes 126 extend over substantially the complete width of the passage 114. The swing vane nozzie assembly 120 also comprises a mechanism 128 for setting the vanes 126 in unison in different pivotal positions. When actuating the mechanism 128, the pins 127 will rotate whereby the position of the vanes 126 will change causing a corresponding change in exhaust gas flow to the turbine 110.

The passage 114 is defined as an axial distance between a front nozzle ring 122 and a rear nozzie ring 124. The front nozzle ring 122 is arranged adjacent to a bearing housing 104 of the turbocharger 100, while the rear nozzle ring 124 is arranged at a distance from the bearing housing 104 inside the turbine housing 102.

Figure 4:
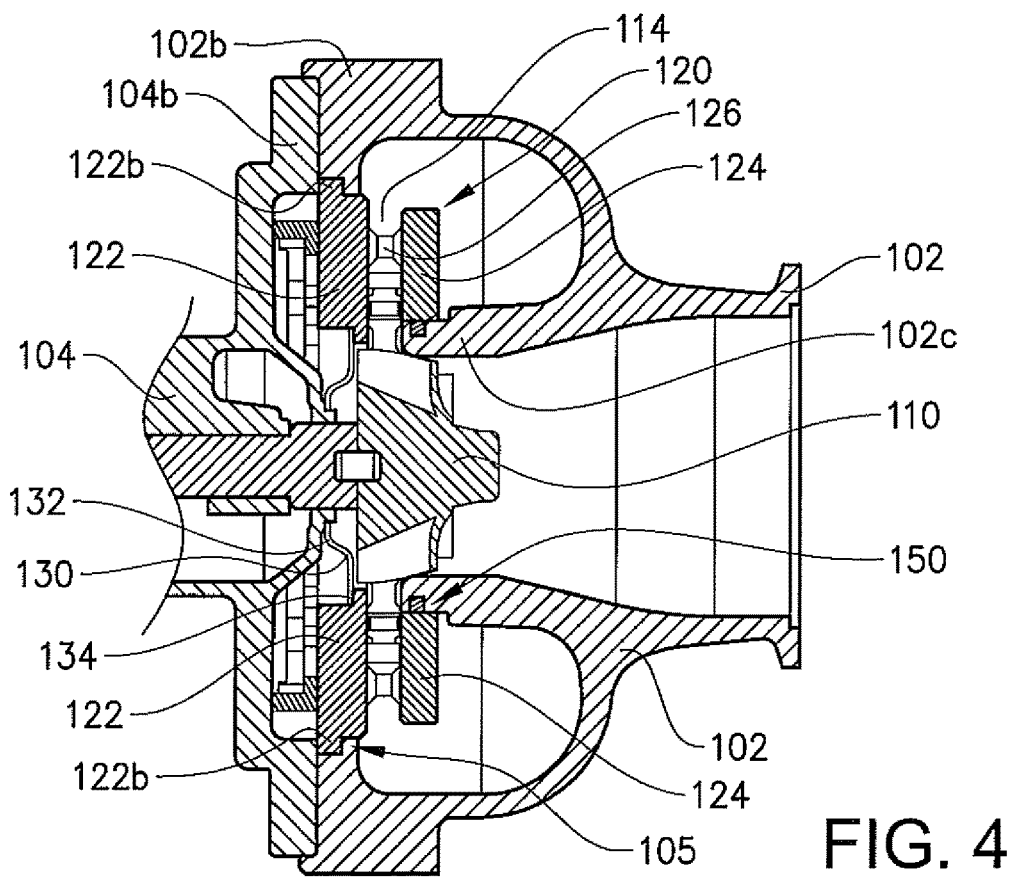
FIG. 4 is a cross-sectional view of a turbocharger according to an embodiment.

The swing vane nozzle assembly 120 is shown in more details in FIG. 4. Exhaust gas enters the turbine housing 102 and flows into the passage 114 formed between the front nozzle ring 22 and the rear nozzle ring 124. The exhaust gas passes the pivotable gas flow control vanes 126 and thereafter causes the turbine 110 to rotate. In order to secure the position of the swing vane nozzle assembly 120 axial as well as radial guidance is required.

The front nozzle ring 122 is formed as an annular disc having an inner periphery and an outer periphery, seen in the radial direction. Further to this, the front nozzle ring 122 has a certain thickness in order to form a rigid ring. The front side of the front nozzle ring 122 is facing the bearing housing 104 while the rear side is facing the turbine housing 102.

The front nozzle ring 122 is arranged in the interface formed by the bearing housing 104 and the turbine housing 102.

The bearing housing 104, supporting the turbine shaft 108, has a rigid portion 104b extending radially outwards. The rigid portion 104b is provided for attaching the bearing housing 104 to the turbine housing 102, as well as to provide an axial guidance of the front nozzle ring 122. Attachment of the bearing housing 104 to the turbine housing 102 may e.g. be accomplished by means of bolts or similar (not shown).

The turbine housing 102 has a rigid portion 102b extending radially outwards and forming the outer periphery of the turbine housing 102. The rigid portion 102b is provided for attaching the bearing housing 104 to the turbine housing 102, as well as to provide an axial guidance of the front nozzle ring 122.

A circumferential recess 105 provided where the rigid portions 102b, 104b meet, i.e. at the interface between the bearing housing 104 and the turbine housing 102, In this recess 105 a radially outer portion of the front nozzle ring 122 is received. The sidewalls of the recess 105 thus form an axial stop for the front nozzle ring 122, whereby axial guidance of the front nozzle ring 122, and the entire swing vane nozzle assembly 120, is achieved. The outer portion of the front nozzle ring 122 may be provided with a lip 122b, such that only the lip 122b is received in the recess 105.

The rear nozzle ring 124 is formed as an annular disc having an inner periphery and an outer periphery, seen in the radial direction. Further to this, the rear nozzle ring 124 has a certain thickness in order to form a rigid ring. The front side of the rear nozzle ring 124 is facing the front nozzle ring 122. Hence the vanes 126 extend between the rear side of the front nozzle ring 122 and the front side of the rear nozzle ring 124.

The turbine housing 102 has a cylindrical portion 102c arranged radially outside the turbine 110. The outer periphery of the cylindrical portion 102c forms a supporting surface for the rear nozzle ring 124, such that the rear nozzle ring 124 may be press fitted or have a light clearance onto the cylindrical portion 102c. Radial guidance of the rear nozzle ring 124, and the entire swing vane nozzle assembly 120, is thereby achieved.

According to the embodiment shown in FIG. 4, the swing vane nozzle assembly 120 comprises a front nozzle, ring 122, a rear nozzle ring 124, and a plurality of pivotable gas flow control vanes 126 arranged between the front nozzle ring 122 and the rear nozzle ring 124. The rear nozzle ring 124 is radially guided by the turbine housing 102, and a radially outer portion of the front nozzle ring 122 is clamped between the bearing housing 104 and the turbine housing 102 thus forming an axial guidance of the front nozzle ring 122. Further, apt inner periphery of the front nozzle ring 122 is arranged at a distance from the bearing housing 104.

The interface between the bearing housing 104 and the turbine housing 102 forms a recess 105 in which the radially outer portion of the front nozzle ring 122 is received; the width of the recess 105 may be slightly larger than the width of radially outer portion of the front nozzle ring 122 such that the axial guidance is formed by a light clearance fit.

A seal 150 may be provided between the cylindrical portion 102c of the turbine housing 102 and the inner periphery of the rear nozzle ring 124. The seal may be an O-ring.

As is further shown in FIG. 4 a heat shield 130 is arranged between the bearing housing 104 and the inner periphery of the front nozzle ring 122, The heat shield 130, preventing excessive beat of the exhaust gases inside the turbine housing 102 to be transferred into the bearing housing 104, is formed as a circular disc having a centrally arranged hole for receiving a tubular portion of the bearing housing 104. Hence, the heat shield 130 has an annular shape. The heat shield 130 has a radially inner portion 132 and a radially outer portion 134, the outer portion being axially displaced relative the inner portion 132. The displacement of the outer portion 134 is directed axially towards the turbine 110 such that the outer portion 134 of the heat shield 130 seals against the front nozzle ring 122.

Figure 5:
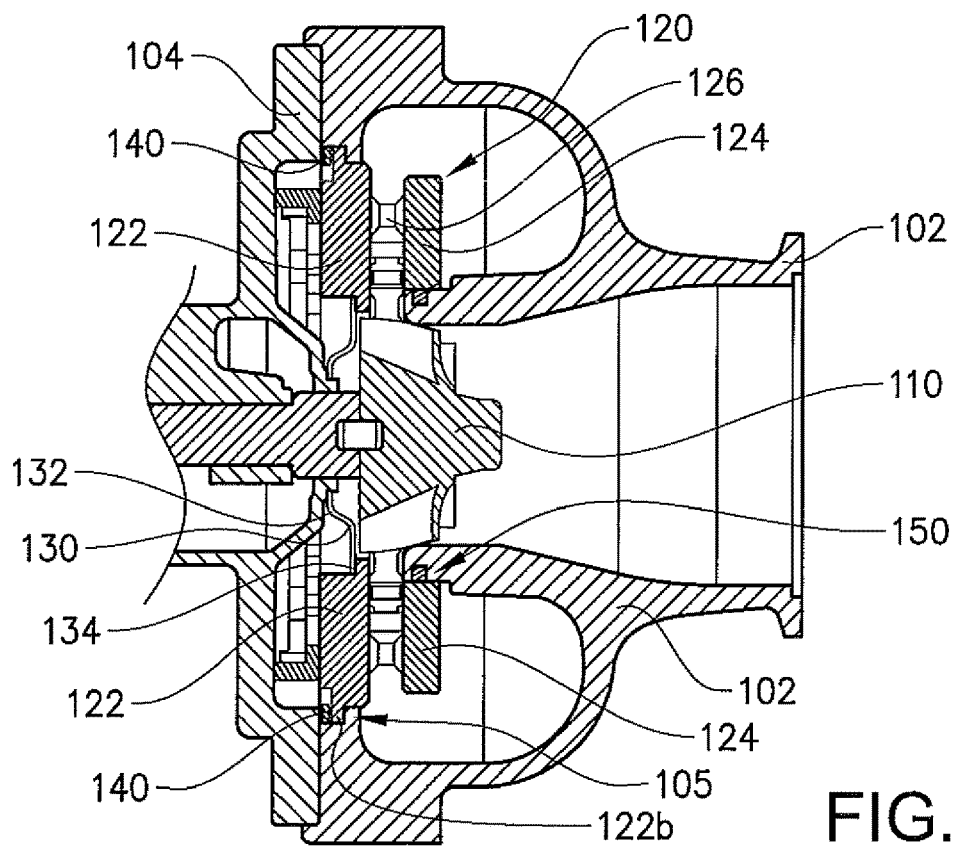
FIG. 5 is a cross-sectional view of a turbocharger according to a further embodiment.

Now turning to FIG. 5 a further embodiment of a turbocharger 100 will be described. The turbocharger 100 of FIG. 5 shows great similarity with the turbocharger 100 previously described with reference to FIG. 4; hence the same reference numerals will be used. The turbocharger 100 of FIG. 5 however differs in that the axial guidance of the swing vane nozzle assembly 120 is achieved by a spring 140 biasing the front nozzle ring 122 towards the turbine housing 102. The spring 140, preferably in the form of a plate spring, is arranged in the recess 105 formed at the interface between the bearing housing 104 and the turbine housing 102.

Figure 6:
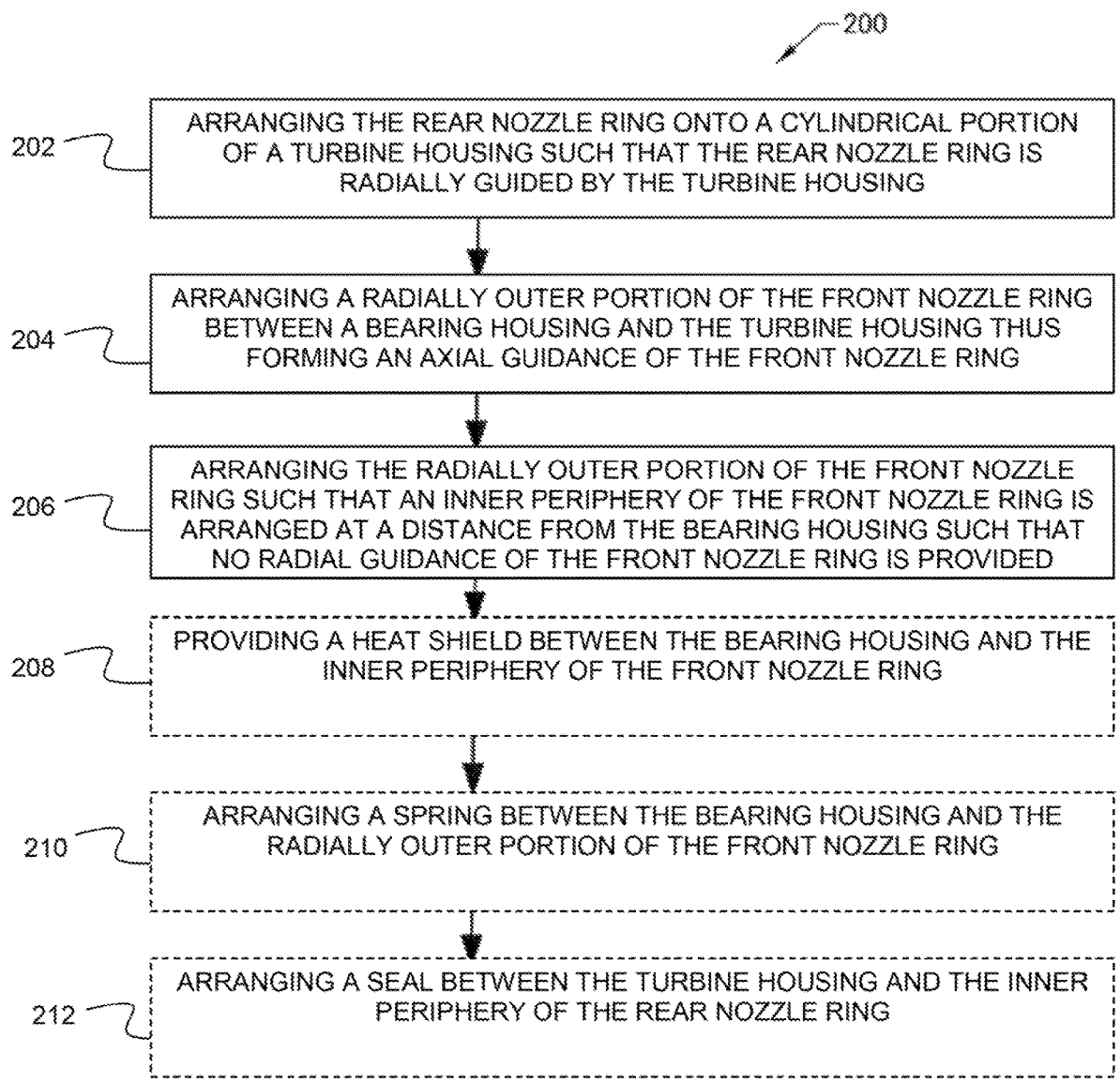
FIG. 6 is a schematic view of a method according to an embodiment.

Now turning to FIG. 6, a method 200 according to various embodiments will be described. The method 200 is performed in order to manufacture a turbocharger 100 with a swing vane nozzle assembly 120 having a front nozzle ring 122, a rear nozzle ring 124, and a plurality of pivotable gas flow control vanes 126 arranged between the front nozzle ring 122 and the rear nozzle ring 124, The method 200 comprises a step 202 of arranging the rear nozzle ring 124 onto a cylindrical portion 102c of a turbine housing 102 such that the rear nozzle ring 124 is radially guided by the turbine housing 102. Further, the method 200 comprises a step 204 of arranging a radially outer portion 122b of the front nozzle ring 122 between a bearing housing 104 and the turbine housing 102 thus forming an axial guidance of the front nozzle ring 124. A step 206 is performed by arranging the radially outer portion 122b of the front nozzle ring 122 such that an inner periphery of the front nozzle ring 122 is arranged at a distance from the bearing housing.

The method 200 may farther comprise a step 208 of providing a heat shield 130 between the bearing housing 104 and the inner periphery of the front nozzle ring 122.

The step 208 of providing the heat shield 130 is preferably performed such that the outer portion 134 of the heat shield 130 seals against the front nozzle ring 122.

The method 200 may further comprise an optional step 210 of arranging a spring 140 between the bearing housing 104 and the radially outer portion 122b of the front nozzle ring 122. An optional step 212 may also be performed, in which a seal 150 is arranged between the turbine housing 102 and the inner periphery of the rear nozzle ring 124.

Manufacturing of the turbocharger 100 is preferably performed in the following order. The heat shield 130 is placed in the correct position onto the bearing housing 104, and the correct position may be secured by means of a retainer ring (not shown). Thereafter the turbine wheel 110, including the turbine shaft, is inserted into the bearing housing 104 and the compressor wheel 112 is subsequently attached to the turbine shaft. The swing vane nozzle assembly 120 is thereafter positioned in the correct position relative the bearing housing 104, i.e. such that there is a distance between the inner periphery of the front nozzle ring 122 and the bearing housing 104. The radial distance is occupied by the heat shield 130. The turbine housing 102 is thereafter brought into the correct position relative the bearing housing 104. During this step, the rear nozzle ring 124 will be brought onto the cylindrical portion 102c of the turbine housing 102 thus providing the radial guidance of the swing vane nozzle assembly 120. Secured positioning of the turbine housing 102 relative the bearing housing 104 is provided by tightening a plurality of screws to a specified torque.

It is to be understood that the present invention is not limited to the embodiments described above and illustrated in the drawings; rather, the skilled person will recognize that many changes and modifications may be made within the scope of the appended claims.

The invention claimed is:

1. A turbocharger having a swing vane nozzle assembly, the turbocharger comprising
a turbine housing and a bearing housing, and wherein the swing vane nozzle assembly is configured to control an exhaust gas flow to a turbine arranged inside the turbine housing, the swing vane nozzle assembly comprising
a front nozzle ring, a rear nozzle ring, and a plurality of pivotable gas flow control vanes arranged between the front nozzle ring and the rear nozzle ring, wherein wherein the front nozzle ring radially encircles the turbine;
the rear nozzle ring is radially guided by the turbine housing,
a radially outer portion of the front nozzle ring is clamped between the bearing housing and the turbine housing thus forming an axial guidance of the front nozzle ring;
a radial gap arranged between an inner periphery of the front nozzle ring and a closest portion of the bearing housing, and
wherein an interface between the bearing housing and the turbine housing forms a recess in which the radially outer portion of the front nozzle ring is received, and the turbine housing has a cylindrical portion arranged radially outside the turbine, and outer periphery of the cylindrical portion forming a supporting surface for the rear nozzle ring.

2. The turbocharger according to claim 1, further comprising a heat shield arranged between the bearing housing and the inner periphery of the front nozzle ring.

3. The turbocharger according to claim 2, wherein the heat shield has an annular shape having a radially inner portion and a radially outer portion, the outer portion being axially displaced relative the inner portion.

4. The turbocharger according to claim 3, wherein the outer portion of the heat shield is axially displaced in a direction towards a turbine arranged inside the turbine housing.

5. The turbocharger according to claim 3, wherein the outer portion of the heat shield seals against the front nozzle ring.

6. The turbocharger according to claim 1, wherein the width of the recess is slightly larger than the width of radially outer portion of the front nozzle ring such that the axial guidance is formed by a light clearance fit.

7. The turbocharger according to claim 1, further comprising a spring arranged between the bearing housing and the radially outer portion of the front nozzle ring.

8. The turbocharger according to claim 7, wherein the spring is a plate spring.

9. The turbocharger according to claim 1, further comprising a seal arranged between the turbine housing and the inner periphery of the rear nozzle ring.

10. The turbocharger according to claim 9, wherein the seal is an O-ring.

11. An exhaust aftertreatment system for an internal combustion engine comprising at least one turbocharger according to claim 1.

12. A vehicle comprising an exhaust aftertreatment system according to claim 11.

13. A method for manufacturing a turbocharger with a swing vane nozzle assembly having a front nozzle ring, a rear nozzle ring, and a plurality of pivotable gas flow control vanes arranged between the front nozzle ring and the rear nozzle ring, comprising:
arranging the rear nozzle ring onto a cylindrical portion of a turbine housing such that the rear nozzle ring is radially guided by the turbine housing, the cylindrical portion being arranged radially outside the turbine,
arranging a radially outer portion of the front nozzle ring between a bearing housing and the turbine housing thus forming an axial guidance of the front nozzle ring, an interface between the bearing housing and the turbine housing forming a recess in which a radially outer portion of the front nozzle ring is received, and
arranging a radial gap between an inner periphery of the front nozzle ring and a closest portion of the bearing housing, wherein the outer periphery of the cylindrical portion forms a supporting surface for the rear nozzle ring.

14. The method according to claim 13, further comprising providing a heat shield between the bearing housing and the inner periphery of the front nozzle ring.

15. The method according to claim 14, wherein providing the heat shield is performed such that the outer portion of the heat shield seals against the front nozzle ring.

16. The method according to claim 14, wherein arranging the rear nozzle ring onto a cylindrical portion of a turbine housing and arranging a radially outer portion of the front nozzle ring between a bearing housing and the turbine housing are performed by positioning the swing vane nozzle assembly in the bearing housing, and thereafter arranging the turbine housing in the correct position relative the bearing housing, and wherein arranging the heat shield is performed before the step of positioning the swing vane nozzle assembly in the bearing housing.

17. The method according to claim 13, further comprising arranging a spring between the bearing housing and the radially outer portion of the front nozzle ring.

18. The method according to claim 13, further comprising arranging a seal between the turbine housing and the inner periphery of the rear nozzle ring.

19. The method according to claim 13, wherein arranging the rear nozzle ring onto a cylindrical portion of a turbine housing and arranging a radially outer portion of the front nozzle ring between a bearing housing and the turbine housing are performed by positioning the swing vane nozzle assembly in the bearing housing, and thereafter arranging the turbine housing in the correct position relative the bearing housing.

\* \* \* \* \*